United States Patent
Shiosaka

(10) Patent No.: US 11,919,680 B2
(45) Date of Patent: Mar. 5, 2024

(54) STORAGE CASE

(71) Applicant: SUZUKI MOTOR CORPORATION, Hamamatsu (JP)

(72) Inventor: Taku Shiosaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 194 days.

(21) Appl. No.: 17/213,577

(22) Filed: Mar. 26, 2021

(65) Prior Publication Data

US 2021/0300627 A1 Sep. 30, 2021

(30) Foreign Application Priority Data

Mar. 27, 2020 (JP) ................................. 2020-058062

(51) Int. Cl.
*B65D 25/28* (2006.01)
*B65D 43/16* (2006.01)
*B65D 43/22* (2006.01)

(52) U.S. Cl.
CPC ....... *B65D 25/2858* (2013.01); *B65D 43/163* (2013.01); *B65D 43/22* (2013.01)

(58) Field of Classification Search
CPC .. B65D 43/163; B65D 25/2858; B65D 43/22; B62J 7/08; B62J 9/30
See application file for complete search history.

(56) References Cited

U.S. PATENT DOCUMENTS 4,574,601 A 3/1986 Werk et al.
6,481,605 B1 * 11/2002 Visenzi ...................... B62J 9/30
190/117
2001/0030215 A1 10/2001 Vincenzo
2005/0155804 A1 7/2005 Kamemizu et al.

FOREIGN PATENT DOCUMENTS

| DE | 102015006404 A1 | 11/2016 |
|---|---|---|
| EP | 0133193 A2 | 2/1985 |
| EP | 2 586 687 A2 | 5/2013 |
| JP | U-3024167 | 5/1996 |
| JP | 2000-340642 A | 12/2000 |
| JP | 4332010 B2 | 6/2009 |
| JP | 2013-95227 A | 5/2013 |

OTHER PUBLICATIONS

Indian Office Action issued in IN 202114013244 dated Jan. 31, 2022.
Hearing Notice issued in IN application No. 202114013244 dated Dec. 12, 2023.

* cited by examiner

*Primary Examiner* — Jeffrey R Allen
(74) *Attorney, Agent, or Firm* — TROUTMAN PEPPER HAMILTON SANDERS LLP

(57) ABSTRACT

A storage case where a case cover is openably and closably connected to a case body, the storage case included a latch mechanism fixing the case cover to the case body, a handle swingably connected to a plane to which the latch mechanism is connected, and a locking mechanism configured to lock the latch mechanism and the handle simultaneously. The latch mechanism includes a latch receiving portion configured to be hooked. The handle includes a handle receiving portion configured to be hooked. The locking mechanism includes a locking member hooking the latch receiving portion and the handle receiving portion. In a locked state, the latch receiving portion and the handle receiving portion are arranged in one direction.

10 Claims, 9 Drawing Sheets

STORAGE CASE

CROSS-REFERENCE TO RELATED APPLICATION

This application is based on Japanese Patent Application No. 2020-058062 filed on Mar. 27, 2020, the contents of which are incorporated herein by way of reference.

FIELD OF INVENTION

The present invention relates to a storage case.

BACKGROUND

A storage case whose closed state is maintained by a so-called draw latch mechanism is known (for example, see JP-A-2013-095227). In the storage case described in JP-A-2013-095227, a case cover is openably and closably connected to a case body, and a storage space is formed by the case body and the case cover. A pair of hanging fittings are provided on a front surface of the case body, a pair of receiving fittings are provided on a front surface of the case cover, and the storage case is locked in a state in which the case cover is closed by pushing down a lock lever of the hanging fittings while the hanging fittings are hooked to the receiving fittings.

SUMMARY OF INVENTION

Generally, the storage case is provided with a locking mechanism that performs locking in a state in which the case cover is closed on the case body. The locking mechanism is required to have a structure of locking the handle and the latch mechanism simultaneously, but there is a problem that the locking mechanism is complicated depending on a layout of the handle and the latch mechanism.

The present invention has been made in view of the above circumstances, and an object thereof is to provide a storage case capable of locking a handle and a latch mechanism simultaneously by a locking mechanism having a simple structure.

A storage case according to an aspect of the present disclosure, the storage case where a case cover is openably and closably connected to a case body, the storage case includes a latch mechanism configured to fix the case cover to the case body, a handle swingably connected to a plane to which the latch mechanism is connected, and a locking mechanism configured to lock the latch mechanism and the handle simultaneously, in which the latch mechanism includes a latch receiving portion configured to be hooked, the handle includes a handle receiving portion configured to be hooked, the locking mechanism includes a locking member configured to hook the latch receiving portion and the handle receiving portion, and in a locked state, the latch receiving portion and the handle receiving portion are arranged in one direction, so that the above problem is solved.

DETAILED DESCRIPTION

In a storage case of one aspect of the present invention, a case cover is openably and closably connected to a case body. The case body is provided with a latch mechanism for fixing the case cover, and in the case body, a handle is swingably connected to a plane to which the latch mechanism connected. The latch mechanism and the handle are locked simultaneously by a locking mechanism. The latch mechanism includes latch receiving portions formed so as to be able to be hooked, the handle includes handle receiving portions formed so as to be able to be hooked, and the locking mechanism includes a locking member that hooks the latch receiving portions and the handle receiving portions. In a locked state, the latch receiving portions and the handle receiving portions are arranged in one direction, and the latch receiving portions and the handle receiving portions are hooked and stopped by a linear locking member. Therefore, the locking mechanism can be made into a simple locking structure, and the latch mechanism and the handle can be locked simultaneously.

Figure 1:
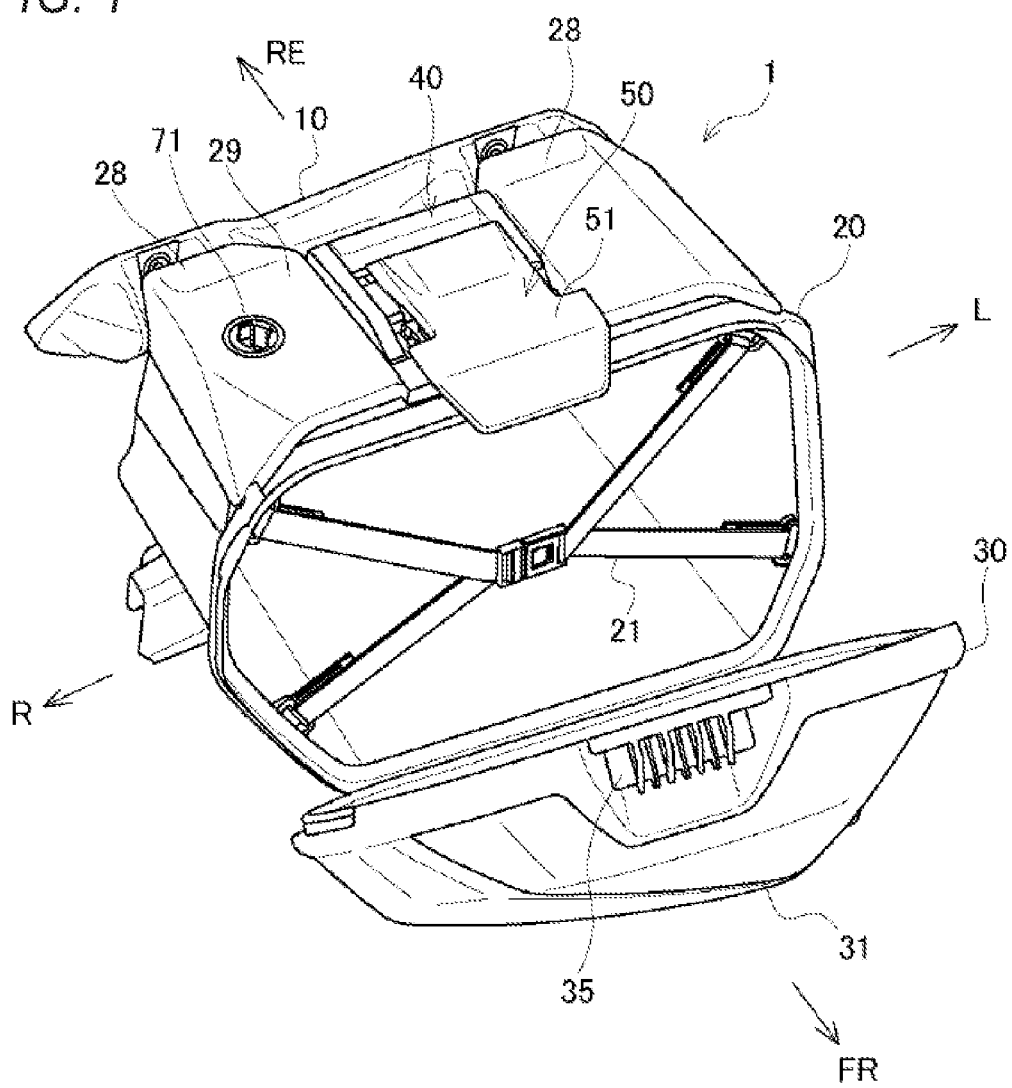
FIG. 1 is a perspective view of a storage case according to the present embodiment.

Hereinafter, the present embodiment will be described in detail with reference to the accompanying drawings. In the following description, a storage case, as a side case, that is attached to a vehicle such as a saddle-type vehicle will be described. However, the storage case of the present embodiment can be applied to other storage cases such as a rear box on a loading platform, a trunk case with casters, and a baggage bag. In the following figures, an arrow FR indicates a case front side, an arrow RE indicates a case rear side, an arrow L indicates a case left side, and an arrow R indicates a case right side. FIG. 1 is a perspective view of the storage case according to the present embodiment.

As illustrated in FIG. 1, a storage case 1 is detachably attached to a case holder 10 on a side portion of the vehicle. A front surface of a case body 20 of the storage case 1 is open, and the case cover 30 is connected to a lower edge of the case body 20 so as to be openable downward via a hinge. A baggage storage space is formed by the case body 20 and the case cover 30, and the case body 20 is provided with an X-shaped inner band 21 for holding the baggage stored in the storage space. Hemispherical elastic legs (not illustrated) are provided at four corners of a bottom surface of the storage case 1, so that the storage case 1 can stand by itself in a stable state even when the storage case 1 is removed from the vehicle.

A handle 40 that makes the storage case 1 portable is swingably connected to the center of an upper surface of the case body 20. A latch mechanism 50 for fixing the case cover 30 to the case body 20 while the case cover 30 is closed is installed inside the handle 40. Further, an upper cover 29 is attached to the upper surface of the case body 20 so as to surround the handle 40 and the latch mechanism 50. A key cylinder 71 of the locking mechanism 70 (see FIG. 6) is exposed from the upper cover 29, and the latch mechanism 50 and the handle 40 can be locked and unlocked by a key inserted into a keyhole of the key cylinder 71.

The locking mechanism 70 locks the latch mechanism 50 and the handle 40 simultaneously. At this time, if a layout of the latch mechanism 50 and the handle 40 is not taken into consideration, a locking structure of the locking mechanism 70 becomes complicated. In particular, if locking positions of the latch mechanism 50 and the handle 40 are largely separated, a metal plate, wire, or the like having a complicated shape must be used for the locking mechanism 70. Therefore, in the storage case 1 of the present embodiment, the locking positions of the latch mechanism 50 and the handle 40 are arranged in one direction, and the latch mechanism 50 and the handle 40 are simultaneously hocked by a linear lock plate 72 (see FIG. 5).

Figure 2:
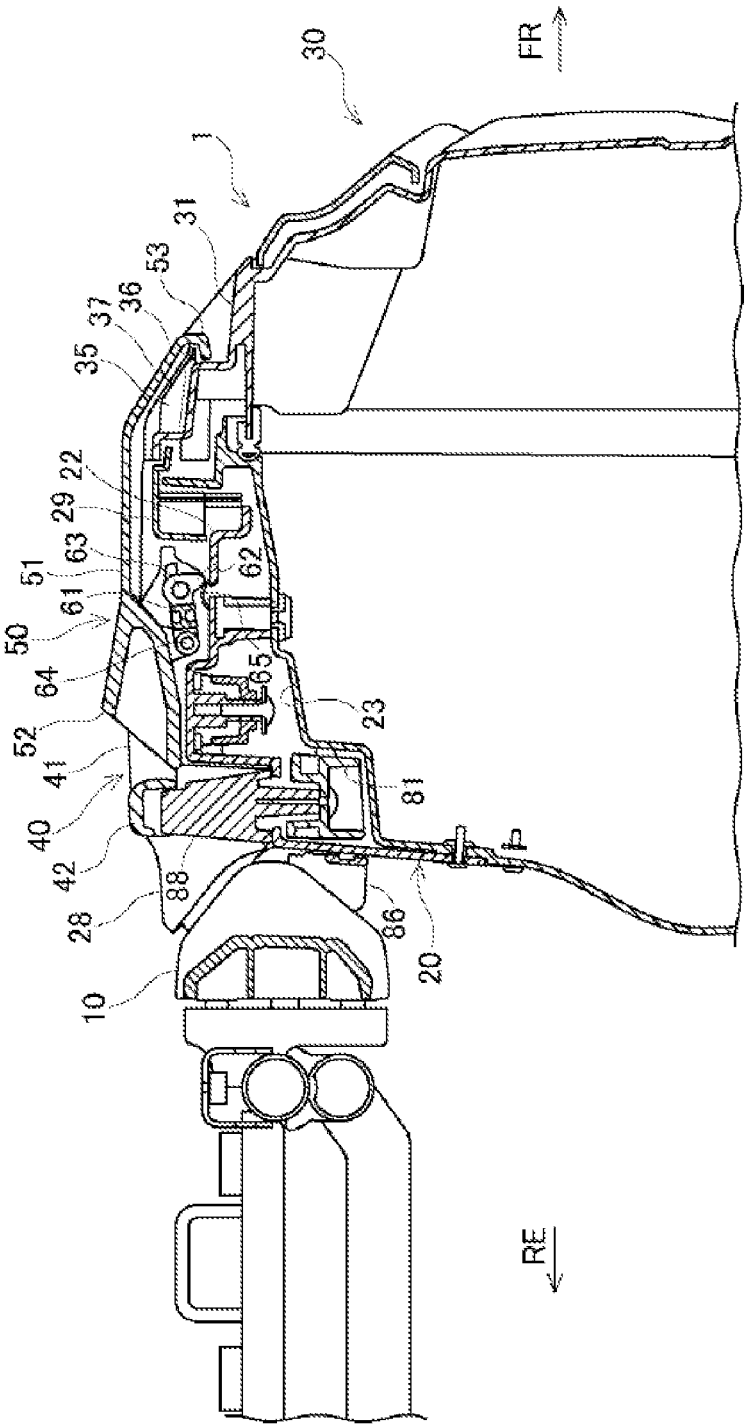
FIG. 2 is a partial cross-sectional view of the storage case according to the present embodiment.
Figure 3:
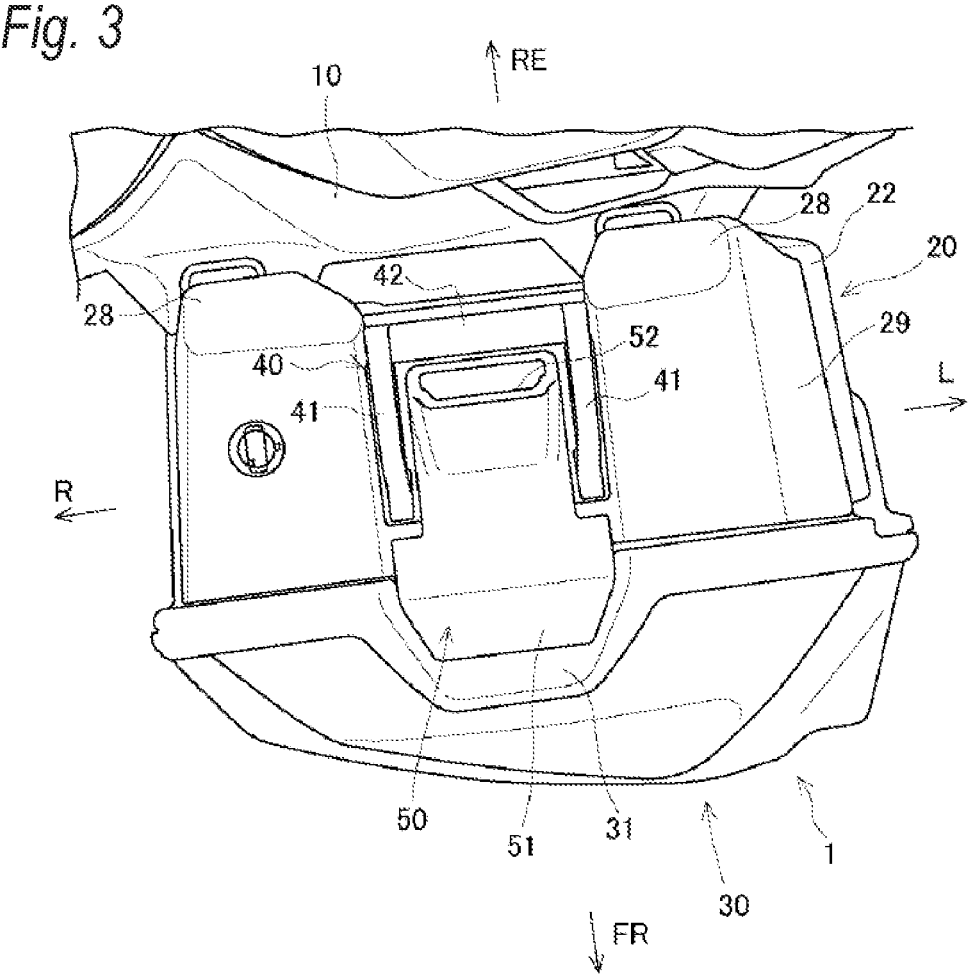
FIG. 3 is a plan view of the storage case according to the present embodiment.
Figure 4:
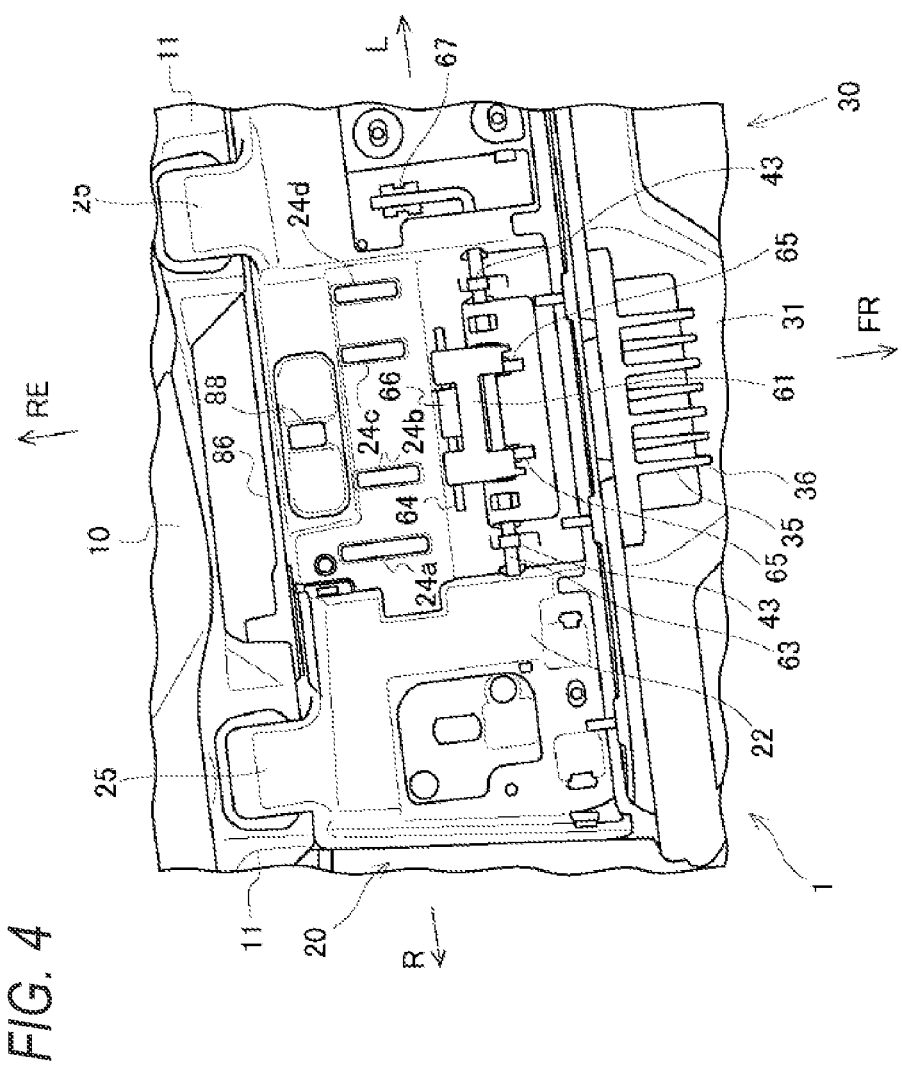
FIG. 4 is a partial plan view of the storage case according to the present embodiment.
Figure 5:
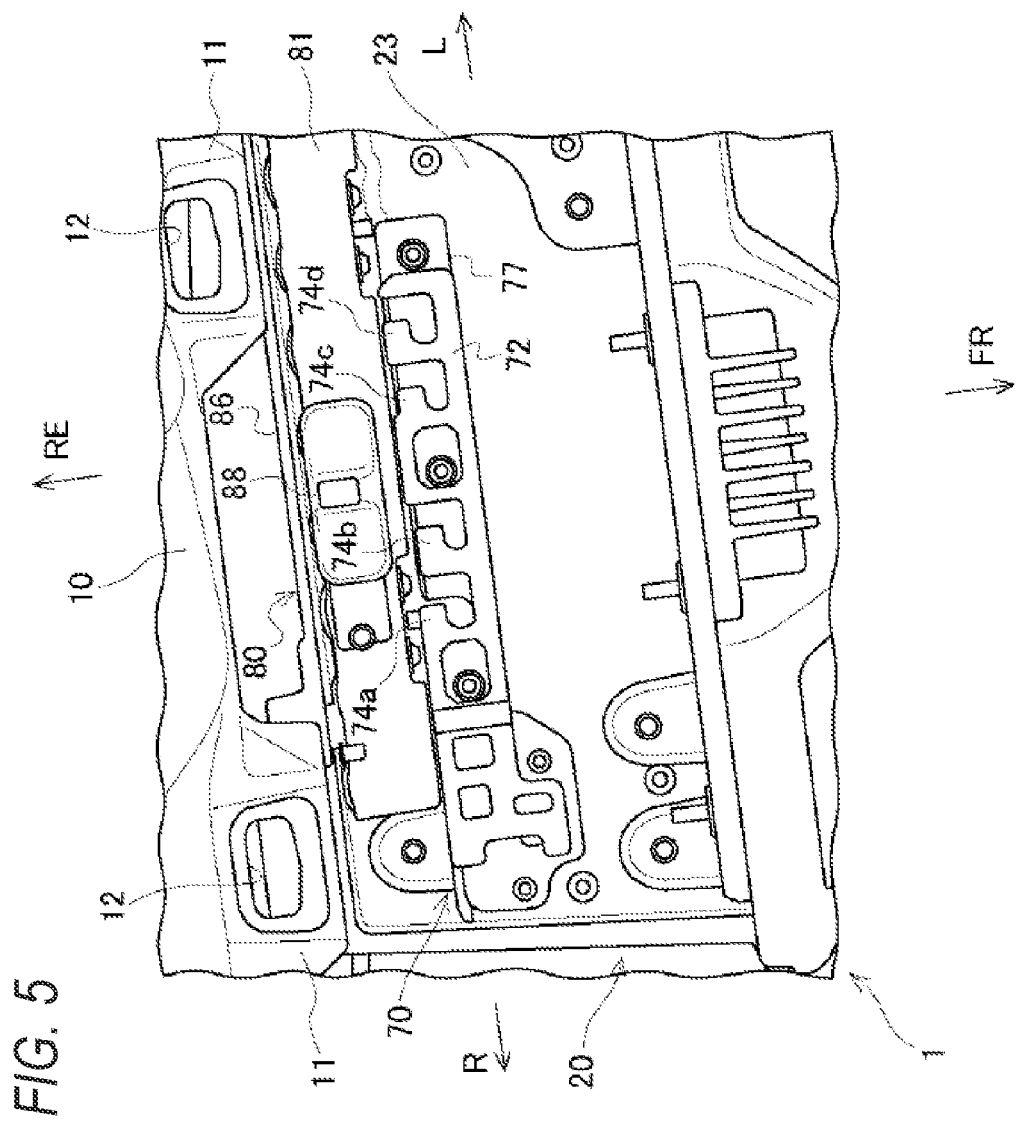
FIG. 5 is a partial plan view of the storage case according to the present embodiment.
Figure 6:
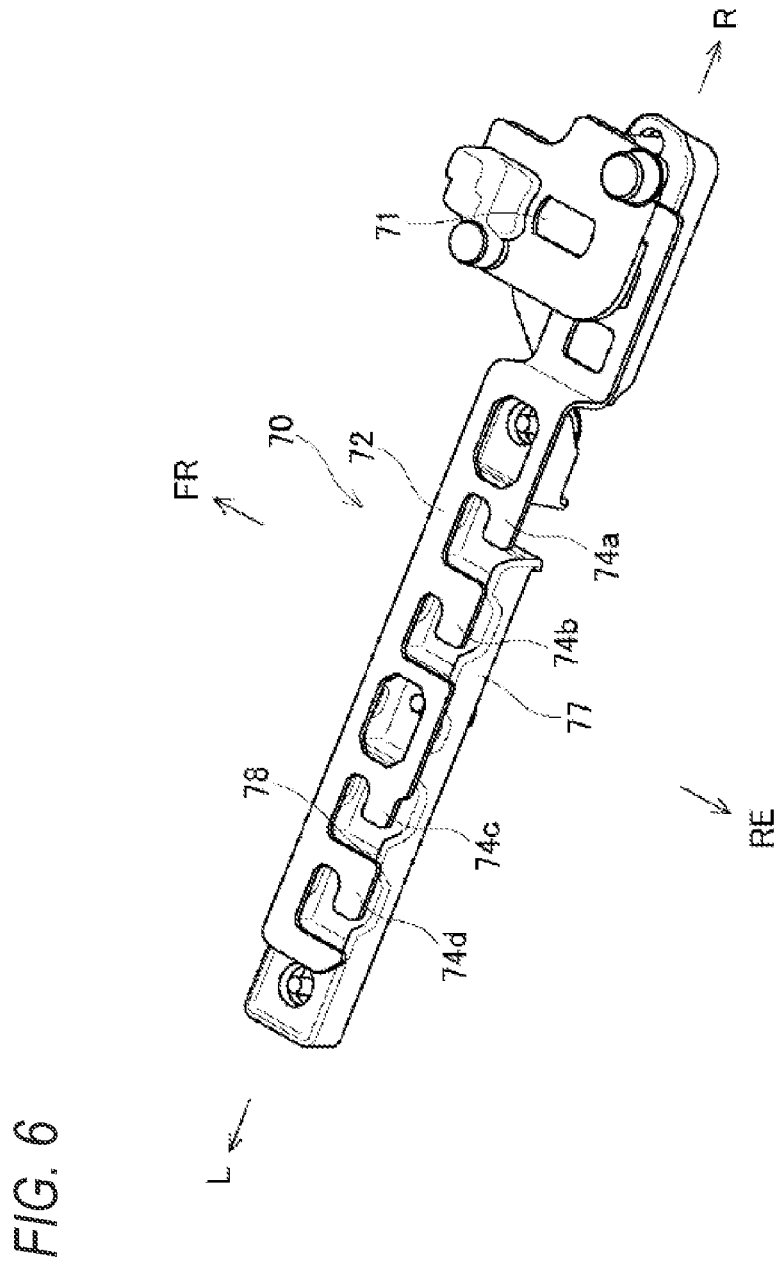
FIG. 6 is a perspective view of a locking mechanism according to the present embodiment.
Figure 7:
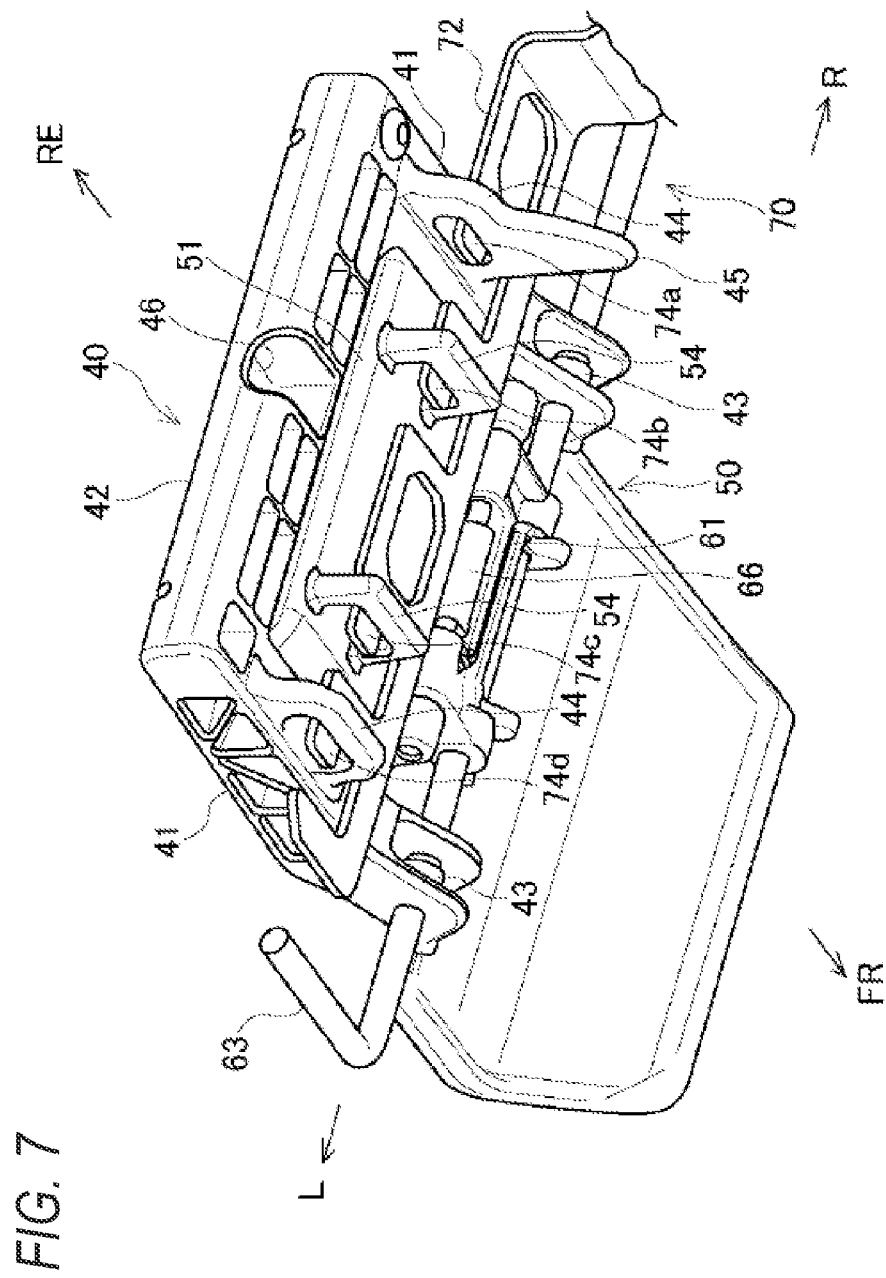
FIG. 7 is a perspective view illustrating a locked state according to the present embodiment.

An upper structure of the storage case will be described with reference to FIGS. 2 to 7. FIG. 2 is a partial cross-sectional view of the storage case according to the present embodiment. FIG. 3 is a plan view of the storage case according to the present embodiment. FIG. 4 is a partial plan view of the storage case according to the present embodiment. FIG. 5 is a partial plan view of the storage case according to the present embodiment. FIG. 6 is a perspective view of the locking mechanism according to the present embodiment. FIG. 7 is a perspective view illustrating a locked state according to the present embodiment. Incidentally, FIG. 4 illustrates a state in which the upper cover, a latch arm, and the handle are removed from the storage case, and FIG. 5 illustrates a state in which an installation cover is further removed.

As illustrated in FIGS. 2 to 4, an upper portion of the case body 20 is formed by an installation cover 22 on which various mechanisms are installed. The upper cover 29 is attached to an upper portion of the installation cover 22 so as to expose the center of an upper surface thereof, and the latch mechanism 50 and the handle 40 are installed in the exposed portion of the installation cover 22 (in particular, see FIG. 3). The latch arm 51 is provided on the upper portion of the installation cover 22 as a hooking fitting of the latch mechanism 50, and an arm receiving portion 35 including a plurality of plate-shaped protrusions are provided on an upper portion of the case cover 30 as receiving fitting of the latch mechanism 50. The latch arm 51 is connected to the installation cover 22 via a connecting arm 61.

The connecting arm 61 is formed in an H shape in a plan view in which a pair of left and right arm portions are included (particularly, see FIG. 4). A base end side of the connecting arm 61 is connected to the installation cover 22 via a first swinging pin 63, and a tip side of the connecting arm 61 is connected to the latch arm 51 via a second swinging pin 64. A cam 62 (particularly, see FIG. 2) is formed on the base end side of the connecting arm 61, and repulsion springs 65 each having an arch shape in a side view that repels the swing of the connecting arm 61 are installed on the installation cover 22. When the connecting arm 61 swings about the first swinging pin 63 and the cam 62 is in elastic contact with the repulsion springs 65, the connecting arm 61 is held in a standing posture in which the latch arm 51 is pushed up and a lying posture in which the latch arm 51 is pulled down.

The latch arm 51 is formed in a wide plate shape extending from the tip side of the connecting arm 61 toward the case cover 30. A cylindrical gripping portion 52 is formed on a base end side of the latch arm 51, and the latch arm 51 is lifted by the gripping portion 52. Further, the base end side of the latch arm 51 is pushed in a pushing-up direction (opening direction) by a torsion spring 66 (in particular, see FIG. 4) mounted on the second swinging pin 64. A hook 53 bent in a C shape in the side view is formed on a tip side of the latch arm 51. When the hook 53 is hooked to a tip of the arm receiving portion 35, the case cover 30 is locked to the case body 20 in the closed state.

A recessed portion 31 is formed in the upper portion of the case cover 30 such that the hook 53 of the latch arm 51 enters, and a bottom surface of the recessed portion 31 is formed in a stepped shape having two upper and lower stages. In the upper stage of the recessed portion 31, the arm receiving portion 35 having a comb shape in the plan view are provided in a case width direction (a left-right direction). A locking claw 36 protruding forward from the upper stage of the recessed portion 31 is formed on the tip side of the arm receiving portion 35. An inclined surface 37 (particularly, see FIG. 2) for guiding the hook 53 of the latch arm 51 toward a claw tip of the locking claw 36 is formed on an upper surface of the arm receiving portion 35. When the hook 53 abuts on the inclined surface 37, the hook 53 is guided to a locking position at which the hook 53 is hooked to the locking claw 36.

The inclined surface 37 of the arm receiving portion 35 is formed in a range from a predetermined position on the base end side to the claw tip of the locking claw 36. In the present embodiment, the inclined surface 37 is formed substantially horizontally from a base end to a substantially intermediate position of the arm receiving portion 35, and is inclined such that the thickness of the arm receiving portion 35 decreases from the substantially intermediate position to the claw tip. The arm receiving portion 35 is formed in an elongated shape in the plan view and facilitates resin molding. The inclined surface 37 may be inclined linearly as in the present embodiment, may be inclined while being curved in a convex shape, or may be inclined while being curved in a concave shape.

The handle 40 is formed in a U shape in the plan view by a pair of support arms 41 that swing about the first swinging pin 63 and a grip 42 that connects the pair of support arms 41. The handle 40 is swingably connected to the same installation cover 22 to which the latch arm 51 is connected, and the base end side of the latch arm 51 is accommodated inside the U-shaped handle 40 in the plan view when the handle 40 is downed. Accordingly, the handle 40 and the latch arm 51 are compactly installed in an installation space on the installation cover 22. Base end sides of the pair of support arms 41 are pushed in a retracting direction (closing direction) by a pair of torsion springs 43 (in particular, see FIG. 4) mounted on the first swinging pin 63.

The first swinging pin 63 extends in the case width direction, and the connecting arm 61 is supported on an inner side in the case width direction of the first swinging pin 63, and the handle 40 is supported on an outer side in the case width direction of the first swinging pin 63. Since the first swinging pin 63 is used for both the connecting arm 61 and the handle 40, the number of components and the cost are reduced, and the latch mechanism 50 and the handle 40 are installed more compactly. Further, one end of the first swinging pin 63 is bent in an L shape, and a tip of the bent portion is restricted from rotating by a holding portion 67 on the installation cover 22. The holding portion 67 suppresses the rotation of the first swinging pin 63 and prevents the handle 40 and the latch arm 51 from rotating together.

As illustrated in FIGS. 5 to 7, the locking mechanism 70 for locking the latch mechanism 50 and the handle 40 simultaneously is provided on a case portion 23 below the installation cover 22. The locking mechanism 70 slides a lock plate (locking member) 72 connected to the key cylinder 71 in the case width direction (left-right direction) with respect to a plate support portion (a support member) 77 fixed to the case body 20 (the case portion 23). The plate support portion 77 is formed in a box shape of which an upper surface is open and the case width direction is set as a long side. Convex portions 78 (particularly, see FIG. 6) are formed on a side wall of the plate support portion 77 so as to be in point contact or line contact with the lock plate 72 and suppress a sliding resistance with respect to the lock plate 72.

The lock plate 72 is formed in a strip shape extending in the case width direction. Four locking pieces 74a to 74d that hook the lock plate 72 and the handle 40 are formed on the lock plate 72. The pair of locking pieces 74b, 74c hook the latch arm 51 on the inner side in the case width direction, and the pair of locking pieces 74a, 74d hook the handle 40 on the outer side in the case width direction. A pair of latch receiving portions 54 hooked to the pair of locking pieces 74b, 74c are formed on the latch arm 51, and a pair of handle receiving portions 44 hooked to the pair of locking pieces 74a, 74d are formed on the handle 40.

Openings which the pair of locking pieces 74b, 74c enter are formed in the pair of latch receiving portions 54, and openings which the pair of locking pieces 74a, 74d enter are formed in the pair of handle receiving portions 44. Four slits 24a to 24d (see FIG. 4) are formed in the installation cover 22 so as to correspond to the pair of latch receiving portions 54 and the pair of handle receiving portions 44. The pair of latch receiving portions 54 protrude to the lower side of the installation cover 22 through the slits 24b, 24c on the inner side in the case width direction, and the pair of handle receiving portions 44 protrude to the lower side of the installation cover 22 through the slits 24a, 24d on the outer side in the case width direction.

The lock plate 72 is slid on the plate support portion 77 by an operation of the key inserted into the key cylinder 71 (see FIG. 6). When the lock plate 72 is slid to a left side, the locking pieces 74a to 74d enter the openings of the pair of latch receiving portions 54 and the pair of handle receiving portions 44. Tips of the four locking pieces 74a to 74d pass through the slits 24a to 24d and face an inner side surface of the installation cover 22 (not illustrated). Accordingly, the latch mechanism 50 and the handle 40 are locked. When the lock plate 72 is slid to a right side, the locking pieces 74a to 74d come off the openings of the pair of latch receiving portions 54 and the pair of handle receiving portions 44 to unlock the latch mechanism 50 and the handle 40. A protruding portion 45 for preventing erroneous locking is provided at a lower portion of one handle receiving portion 44 such that the handle 40 does not descend in the locked state.

At this time, since the latch receiving portions 54 and the handle receiving portions 44 are arranged in the case width direction, the latch receiving portions 54 and the handle receiving portions 44 are simultaneously hooked by the single lock plate 72 that is long in the case width direction. When the lock plate 72 is slid in the case width direction, the latch mechanism 50 and the handle 40 are simultaneously locked and unlocked by the lock plate 72. Therefore, the locking mechanism 70 is also used for both the latch mechanism 50 and the handle 40, and the number of components of the locking mechanism 70 is reduced. Further, since the latch receiving portion 54 and the handle receiving portion 44 are close to each other, the lock plate 72 is formed short to improve the durability of the locking mechanism 70.

As described above, the storage case 1 is attached to the vehicle via the case holder 10. A pair of locking portions 11 (in particular, see FIG. 5) protrude from a front surface of the case holder 10, and locking holes 12 are formed in the respective locking portions 11. A pair of fixing hooks 25 (see FIG. 4) protrude from a rear surface of the installation cover 22, and a tip side of each fixing hook 25 is bent downward. Since the tip sides of the pair of fixing hooks 25 of the installation cover 22 enter the pair of locking holes 12 of the case holder 10, the storage case 1 is detachably hooked to the case holder 10 at two places spaced apart from each other in the case width direction. An eaves portion 28 (see FIG. 2) is formed in the storage case 1 and covers a portion to be hooked to the locking portion 11 to improve design.

Further, a fixing mechanism 80 that fixes a hooked state with respect to the case holder 10 is provided on the case portion 23 below the installation cover 22 (see FIG. 4). The fixing mechanism 80 includes a slider 81 stored inside the case body 20 and a slide hook 86 sliding integrally with the slider 81 outside the case body 20. The slider 81 is formed in a prismatic shape having a long side in the case width direction, and is stored so as to be slidable in the case width direction by a wall surface of the case body 20. A knob portion 88 having a convex shape in the side view is provided on an upper surface of the slider 81, and is exposed from an upper surface of the installation cover 22 (see FIG. 4).

The slider 81 is slid by the operation of the knob portion 88, and the slide hook 86 on a rear surface of the case body 20 is slid. When the slider 81 is slid to the left side, the slide hook 86 is spaced apart from the pair of locking portions 11. The hooked state of the storage case 1 is released by the slide hook 86, and the storage case 1 is detachably hooked to the case holder 10. When the slider 81 is slid to the right side, the slide hook 86 abuts on the pair of locking portions 11. The hooked state of the storage case 1 is fixed by the slide hook 86, and the storage case 1 is undetachably hooked to the case holder 10.

In this way, the slider 81 is slid between an attachment/detachment position where the storage case 1 is attachable and detachable and a fixed position where the storage case 1 is not attachable or detachable. A recess 46 for positioning the slider 81 in the fixed position is formed in the grip 42 of the handle 40 (see FIG. 7). In this case, the knob portion 88 is positioned directly below the grip 42 when the handle 40 is downed, and the recess 46 of the grip 42 corresponds to the knob portion 88 when the slider 81 is positioned at the fixed position. When a tip of the knob portion 88 enters the recess 46, the slider 81 is positioned at the fixed position, and the slider 81 is held at the fixed position by the handle 40.

When the slider 81 is not positioned at the fixed position, the knob portion 88 interferes with the grip 42, so that the handle 40 cannot be completely downed. The pair of handle receiving portions 44 enter the slits 24a, 24d (see FIG. 4) of the installation cover 22 halfway, and hinder the sliding of the lock plate 72 of the locking mechanism 70. In this way, the locking mechanism 70 can lock the handle 40 and the latch mechanism 50 only when the slider 81 is positioned at the fixed position. Therefore, the handle 40 and the latch mechanism 50 are not locked in a state in which the storage case 1 is attachable to and detachable from the case holder 10.

On the other hand, when the slider 81 is positioned at the fixed position, the knob portion 88 enters the recess 46 of the handle 40, and the handle 40 is completely downed. Therefore, the sliding of the lock plate 72 of the locking mechanism 70 is not hindered by the pair of handle receiving portions 44. When the latch mechanism 50 and the handle 40 are locked by the locking mechanism 70, the slider 81 is fixed to the fixed position by the handle 40, so that the storage case 1 is not attachable or detachable from the case holder 10. Accordingly, with the locking operation of the latch mechanism 50 and the handle 40, the fixing mechanism 80 is also locked by the handle 40 locked by the locking mechanism 70.

Figure 8:
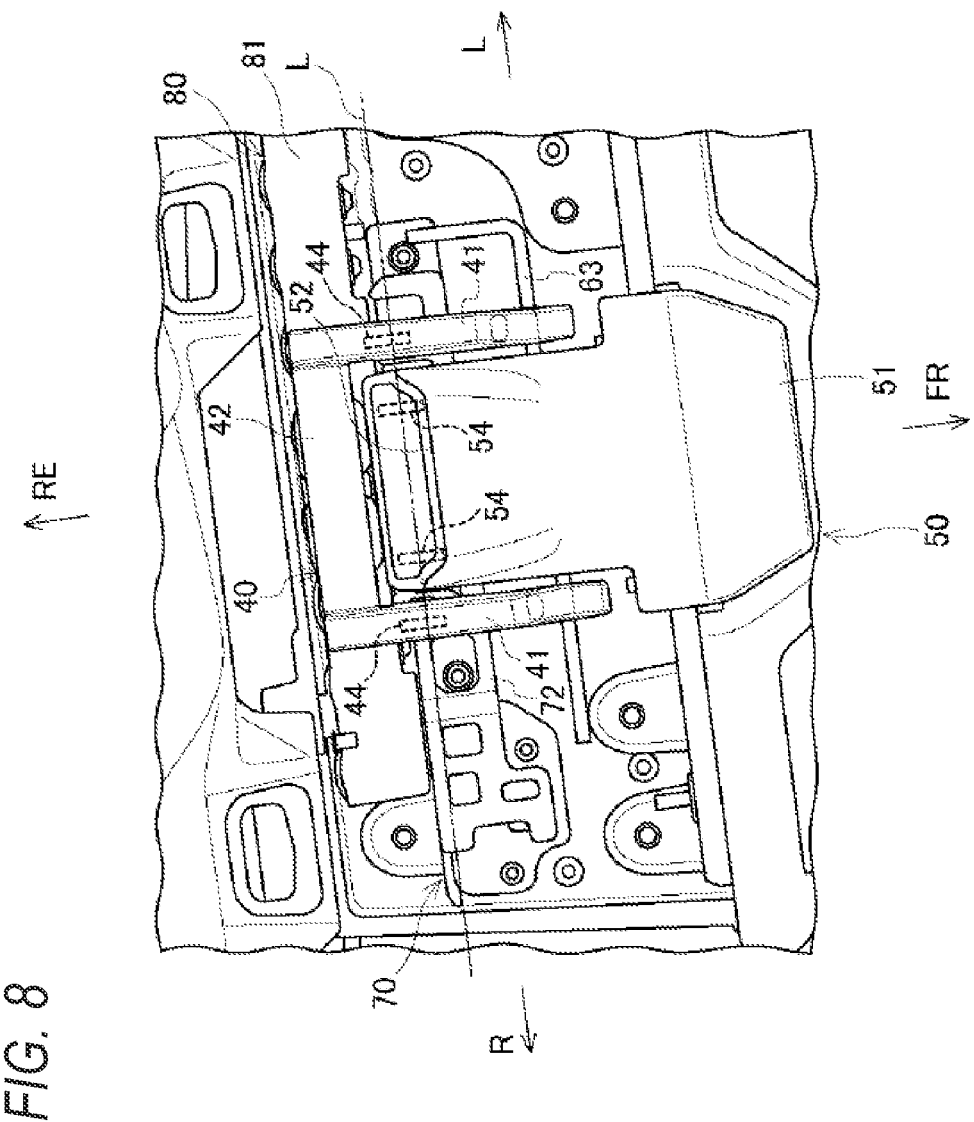
FIG. 8 is a diagram illustrating a layout of an upper portion of the storage case according to the present embodiment.

A layout of an upper portion of the storage case will be described with reference to FIG. 8. FIG. 8 is a diagram illustrating the layout of the upper portion of the storage case according to the present embodiment. Incidentally, FIG. 8 illustrates a state in which the installation cover is removed from an upper surface of the storage case.

As illustrated in FIG. 8, the base end side of the latch arm 51 is formed in a rectangular shape, and the tip side of the latch arm 51 is formed larger in the case width direction than the base end side. The handle 40 is formed in a U shape in the plan view along an outer edge of the latch arm 51 on the base end side. That is, a facing distance between the pair of support arms 41 of the handle 40 is larger than a width dimension of the latch arm 51 on the base end side, and the grip 42 of the handle 40 is further separated from the first swinging pin 63 than the base end side (the gripping portion 52) of the latch arm 51. In this way, since the base end side of the latch arm 51 is accommodated inside the handle 40, the handle 40 does not interfere with the latch mechanism 50 even if the handle 40 is downed.

Both the handle 40 and the connecting arm 61 (see FIG. 4) of the latch mechanism 50 are supported by the first swinging pin 63. It is not necessary to separately prepare swinging pins for the handle 40 and the connecting arm 61, and the handle 40 and the latch mechanism 50 can be installed more compactly. One end of the first swinging pin 63 is bent in an L shape and prevented from rotating by the holding portion 67 (see FIG. 4), but the other end of the first swinging pin 63 is formed straight, and the first swinging pin 63 does not interfere with the key cylinder 71 (see FIG. 4) of the locking mechanism 70. In this way, the holding portion 67 for restricting the rotating of the first swinging pin 63 is provided on a side opposite to the key cylinder 71 in the case width direction. The holding portion 67 may prevent the rotating of the first swinging pin 63.

The lock plate 72 of the locking mechanism 70 extends in parallel with the first swinging pin 63, and is installed so as to overlap the handle 40 and the latch mechanism 50 in the plan view. In other words, the lock plate 72 of the locking mechanism 70 extends in parallel with the first swinging pin 63, and is installed so as to overlap the handle 40 and the latch mechanism 50 in a vertical direction perpendicular to a direction in which a swing shaft of the handle 40 extends and to a direction in which an open-close direction of the case cover 30. More specifically, when the handle 40 is downed, the lock plate 72 is positioned between a swing shaft of the pair of support arms 41 (a straight portion of the first swinging pin 63) and the grip 42. A pair of handle receiving portions 44 are formed on lower surfaces of the pair of support arms 41 corresponding to the locking pieces 74*a*, 74*d* (see FIG. 5) of the lock plate 72, and a pair of latch receiving portions 54 are formed on a lower surface of the latch arm 51 corresponding to the locking pieces 74*b*, 74*c* (see FIG. 5) of the lock plate 72.

Since centers of the openings of the handle receiving portions 44 and the latch receiving portions 54 are positioned at the same height, a height dimension of the lock plate 72 is suppressed. In other words, since the centers of the openings of the handle receiving portions 44 and the centers of the openings of the latch receiving portions 54 are disposed at the same position in the vertical direction, the height dimension of the lock plate 72 is suppressed. Further, since the centers of the openings of the handle receiving portions 44 and the latch receiving portions 54 are positioned on a straight line L in the plan view, a width dimension of the lock plate 72 orthogonal to the straight line L is suppressed. In other words, since the centers of the openings of the handle receiving portions 44 and the latch receiving portions 54 are positioned on a straight line L in the vertical direction, a width dimension of the lock plate 72 orthogonal to the straight line L is suppressed. The lock plate 72 is formed long in the plan view and small in the height direction and the width direction, and a space occupied by the lock plate 72 is elongated in the case width direction. A part of the space occupied by the lock plate 72 overlaps spaces occupied by the handle 40 and the latch mechanism 50.

The slider 81 of the fixing mechanism 80 extends in parallel with the first swinging pin 63 and is installed so as to overlap the handle 40 in the plan view. More specifically, when the handle 40 is downed, the slider 81 is positioned directly below the grip 42. The slider 81 is formed long in the plan view, and a space occupied by the slider 81 is elongated in the case width direction. The slider 81 is adjacent to the lock plate 72, and a slide area of the lock plate 72 and a slide area of the slider 81 are arranged in parallel below the handle 40. A part of the space occupied by the slider 81 overlaps the space occupied by the handle 40.

In this way, the latch mechanism 50 is partially accommodated inside the handle 40, and the lock plate 72 of the locking mechanism 70 and the slider 81 of the fixing mechanism 80 are adjacent to each other in parallel. Further, the lock plate 72 and the slider 81 are positioned below the handle 40 and the latch mechanism 50, and the spaces occupied by the handle 40 and the latch mechanism 50 overlap spaces occupied by the locking mechanism 70 and the fixing mechanism 80. Therefore, the handle 40, the latch mechanism 50, the locking mechanism 70, and the fixing mechanism 80 are compactly installed on the upper portion of the storage case 1 without interfering with each other.

Figure 9A:
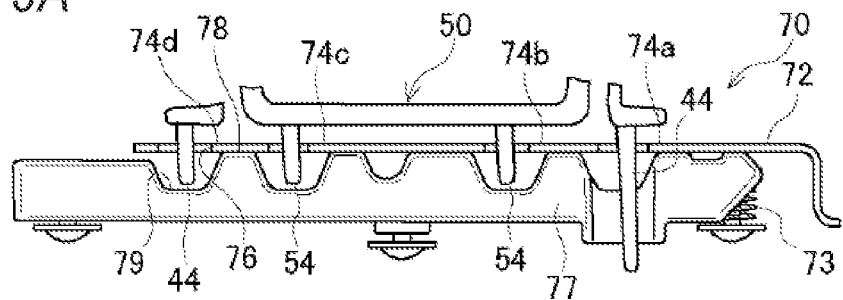
FIGS. 9A to 9D are transition diagrams of a locking operation of the locking mechanism according to the present embodiment.
Figure 9B:
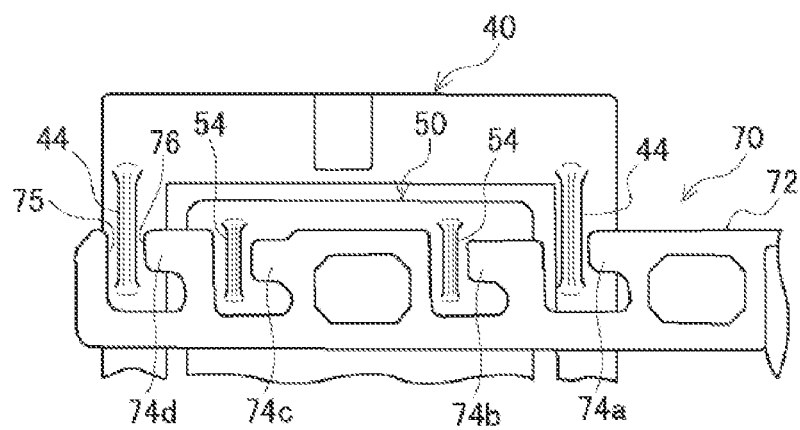
Figure 9C:
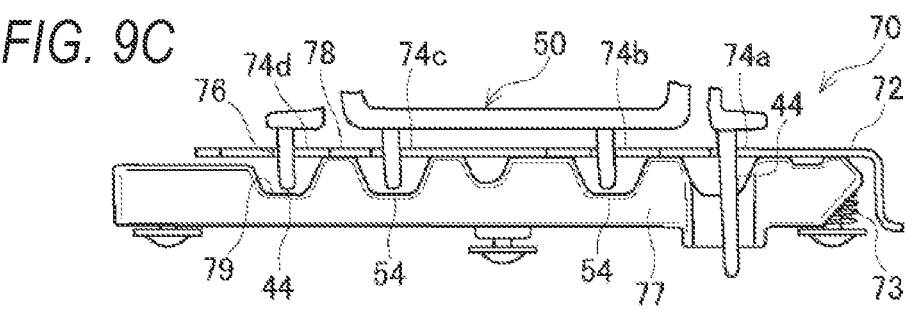
Figure 9D:
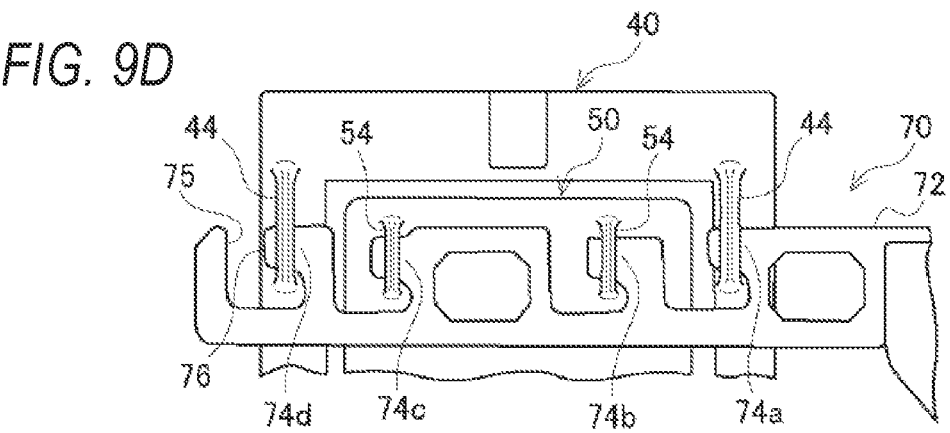

A locking operation of the locking mechanism will be described with reference to FIGS. 9A to 9D. FIGS. 9A to 9D are transition diagrams of the locking operation of the locking mechanism according to the present embodiment, where FIGS. 9A and 9B illustrate an unlocked state of the locking mechanism, and FIGS. 9C and 9D illustrate a locked state of the locking mechanism.

As illustrated in FIGS. 9A and 9B, in the unlocked state of the locking mechanism 70, the locking pieces 74*a* to 74*d* of the lock plate 72 come off the openings of the pair of latch receiving portions 54 and the pair of handle receiving portions 44. At this time, a plate support portion 77 is pressed against the lock plate 72 by a coil spring 73, and the lock plate 72 is supported by the plate support portion 77 from below. A plurality of concave portions 79 are formed in a side wall of the plate support portion 77 so as to escape from the pair of latch receiving portions 54 and the pair of handle receiving portions 44, and the plurality of convex portions 78 that support the lock plate 72 are formed between the plurality of concave portions 79.

Further, the lock plate 72 is cut out in an L shape in the plan view so that the pair of latch receiving portions 54 and the pair of handle receiving portions 44 can be hooked. Each notch 75 of the lock plate 72 is aligned with each concave portion 79 of the plate support portion 77, and the pair of latch receiving portions 54 and the pair of handle receiving portions 44 can enter the concave portions 79 through the notches 75. Further, the plurality of convex portions 78 of the plate support portion 77 are in contact with the locking pieces 74a to 74d of the lock plate 72, and a contact area of the plate support portion 77 with the lock plate 72 is minimized.

As illustrated in FIGS. 9C and 9D, when the lock plate 72 slides by a key operation, the locking pieces 74a to 74d are positioned above the plurality of concave portions 79 of the plate support portion 77. The locking pieces 74a to 74d enter the openings of the pair of latch receiving portions 54 and the pair of handle receiving portions 44, and the pair of latch receiving portions 54 and the pair of handle receiving portions 44 are hooked by the locking pieces 74a to 74d, so that the latch mechanism 50 and the handle 40 are locked. During this locking operation, since the contact area of the plate support portion 77 with the lock plate 72 is minimized, the sliding resistance to the lock plate 72 is reduced and the operability of the locking mechanism 70 is improved.

Further, during the locking operation, the plurality of convex portions 78 continue to be in contact with at least a part of the locking pieces 74a to 74d. An edge 76 is formed in the lock plate 72 by the notch 75, but since the locking pieces 74a to 74d do not completely come off the plurality of convex portions 78, the convex portions 78 are not scraped by the edges 76. Therefore, even if the plate support portion 77 is pressed against the lock plate 72 by the coil spring 73, damage to the plate support portion 77 due to the slide of the lock plate 72 is prevented. In this way, the latch mechanism 50 and the handle 40 can be locked simultaneously with a simple configuration in which a single lock plate 72 is slid.

On the other hand, an unlocking operation of the locking mechanism 70 is performed in a reverse procedure of the locking operation. That is, when the lock plate 72 slides in a direction opposite to the locking operation by the key operation, the locking pieces 74a to 74d come off the openings of the pair of latch receiving portions 54 and the pair of handle receiving portions 44. Accordingly, the hooking of the pair of latch receiving portions 54 and the pair of handle receiving portions 44 by the locking pieces 74a to 74d is released, and the latch mechanism 50 and the handle 40 are unlocked. During the unlocking operation, since the plurality of convex portions 78 continue to be in contact with at least a part of the locking pieces 74a to 74d, the convex portions 78 are not scraped by the edges 76 of the lock plate 72.

As described above, according to the present embodiment, the pair of latch receiving portions 54 of the latch mechanism 50 and the pair of handle receiving portions 44 of the handle 40 are arranged in one direction. Therefore, the pair of latch receiving portions 54 and the pair of handle receiving portions 44 can be hooked by the linear lock plate 72. Therefore, the locking mechanism 70 can be made into a simple locking structure, and the latch mechanism 50 and the handle 40 can be locked simultaneously.

Further, in the present embodiment, although the latch arm is connected to the case body via the connecting arm, the latch arm may be directly connected to the case body, or may be connected to the case body via another link mechanism.

Further, in the present embodiment, the single latch arm is hooked to the arm receiving portion including the plurality of plate-shaped protrusions, but the number of the latch arms and the number of the arm receiving portions are not particularly limited. For example, a plurality of the latch arms may be hooked to the plurality of the arm receiving portions, or a single latch arm may be hooked to a single arm receiving portion.

Further, in the present embodiment, the handle is formed in the U shape in the plan view, but the shape of the handle can be changed as appropriate. The handle includes the support arm swinging about the swing shaft extending in the case width direction and the grip extending from the support arm in the case width direction, and is formed as long as a part of the latch mechanism is located on a side of the grip from the support arm in the case width direction when the handle is downed. For example, the handle may be formed in a L shape in the plan view by one support arm and the grip.

Further, in the present embodiment, the openings are formed in the latch receiving portions and the handle receiving portions, but the latch receiving portions and the handle receiving portions may be formed so as to be able to be hooked. For example, the latch receiving portions and the handle receiving portions may be formed in a hook shape.

Further, in this embodiment, the latch receiving portions and the handle receiving portions are arranged in the case width direction, but the arrangement direction of the latch receiving portions and the handle receiving portions is not particularly limited. The latch receiving portions and the handle receiving portions only need to be arranged in one direction. For example, the latch receiving portions and the handle receiving portions may be arranged in a case front-rear direction or may be arranged in an oblique direction.

Further, in the present embodiment, the lock plate is positioned between the swing shaft of the pair of support arms and the grip, but the lock plate may be positioned at a position apart from the handle.

Further, in the present embodiment, the convex portions are formed on the plate support portion, but if the sliding resistance of the plate support portion is low, the convex portions may not be formed.

Further, in this embodiment, the handle and the latch mechanism (latch arm) are supported by the first swinging pin, but the handle and the latch mechanism may be supported by different swinging pins.

Further, in the present embodiment, storage cases are attached to left and right sides of the vehicle, but the storage cases may be attached to front and rear sides of the vehicle. Although the case body of the storage case is attached to the case holder, the case cover of the storage case may be attached to the case holder.

As described above, a storage case 1 according to the present embodiment is a storage case where a case cover 30 is openably and closably connected to a case body 20, and includes a latch mechanism 50 configured to fix the case cover to the case body; a handle 40 swingably connected to a plane to which the latch mechanism is connected; and a locking mechanism 70 configured to lock the latch mechanism and the handle simultaneously, in which the latch mechanism includes latch receiving portions 54 configured to be hooked, the handle includes handle receiving portions 44 configured to be hooked, the locking mechanism includes a locking member (a lock plate 72) configured to hook the latch receiving portions and the handle receiving portions, and in a locked state, the latch receiving portions and the handle receiving portions are arranged in one direction.

According to this configuration, since the latch receiving portions of the latch mechanism and the handle receiving portions of the handle are arranged in one direction, the latch receiving portions and the handle receiving portions can be hooked by a linear locking member. Therefore, the locking mechanism can be made into a simple locking structure, and the latch mechanism and the handle can be locked simultaneously.

In the storage case according to the present embodiment, the handle is formed in a U shape, the latch mechanism is installed inside the handle, and the locking member is installed so as to overlap the handle and the latch mechanism in a vertical direction perpendicular to a direction in which a swing shaft of the handle extends and to a direction in which an open-close direction of the case cover. According to this configuration, spaces occupied by the latch mechanism, the handle, and the locking member are reduced, and the latch mechanism, the handle, and the locking mechanism can be installed compactly. Further, the latch receiving portions and the handle receiving portions can be hooked by the same locking member to reduce the number of components and to make the locking structure simpler.

In the storage case according to the present embodiment, in the locked state, the latch receiving portions and the handle receiving portions are disposed at the same position in the vertical direction. According to this configuration, since the latch receiving portions and the handle receiving portions are at the same height, a height dimension of the locking member can be suppressed.

In the storage case according to the present embodiment, in the locked state, the latch receiving portions and the handle receiving portions are positioned on a same straight line L in the vertical direction. According to this configuration, since the latch receiving portions and the handle receiving portions are on a straight line, a width dimension of the locking member orthogonal to the straight line can be suppressed.

In the storage case according to the present embodiment, the locking member extends in parallel to the swing shaft. According to this configuration, the locking member is brought close to the handle, and the handle and the locking mechanism can be compactly installed.

In the storage case according to the present embodiment, the handle includes a pair of support arms 41 swingably connected to an outer surface of the case, and a grip 42 connecting the pair of support arms, and when the handle is downed, the locking member is positioned between a swing shaft of the pair of support arms and the grip. According to this configuration, spaces occupied by the latch mechanism, the handle, and the locking member are reduced, and the handle and the locking mechanism can be installed compactly.

In the storage case according to the present embodiment, the locking mechanism includes a support member (a plate support portion 77) slidably supporting the locking member along a locking operation direction, and convex portions 78 in point contact or line contact with the locking member are formed on a support surface of the support member. According to this configuration, since the support member is in point contact or line contact with the locking member, a sliding resistance to the locking member is reduced and operability of the locking mechanism is improved.

In the storage case according to the present embodiment, the locking member is cut out so as to hook the latch receiving portions and the handle receiving portions, and the convex portions of the support member are in contact with at least a part of the locking member during locking and unlocking operations. According to this configuration, edges are formed in the locking member by notches, but the convex portions of the support member are not scraped by the edges during the locking operation and the unlocking operation.

Although the present embodiment has been described, the above-described embodiment and the modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical concepts can be implemented by the methods through advance of the technology or other derivative technology. Accordingly, the claims cover all embodiments that may be included within the scope of the technical concepts.

What is claimed is:

1. A storage case in which a case cover is openably and closably connected to a case body, the storage case comprising:
   a latch mechanism configured to fix the case cover to the case body;
   a handle swingably connected to a plane to which the latch mechanism is connected; and
   a locking mechanism configured to lock the latch mechanism and the handle simultaneously,
   wherein the latch mechanism includes a latch receiving portion configured to be hooked,
   wherein the handle includes a handle receiving portion configured to be hooked,
   wherein the locking mechanism includes a locking member configured to hook the latch receiving portion and the handle receiving portion,
   wherein in a locked state, the latch receiving portion and the handle receiving portion are arranged so as to overlap each other in a direction in which a swing shaft of the handle extends,
   wherein the locking member has a first locking piece which hooks to the handle receiving portion and a second locking piece which hooks to the latch receiving portion, the first locking piece and the second locking piece are arranged in the direction in which the swing shaft of the handle extends, and
   wherein the locking member extends in the direction in which the swing shaft of the handle extends.

2. The storage case according to claim 1,
   wherein the handle is formed in a U shape,
   wherein the latch mechanism is installed inside the handle, and
   wherein the locking member is installed so as to overlap the handle and the latch mechanism in a vertical direction perpendicular to the direction in which the swing shaft of the handle extends and an open-close direction of the case cover.

3. The storage case according to claim 1,
   wherein in the locked state, the latch receiving portion and the handle receiving portion are disposed at a same position in a vertical direction perpendicular to the direction in which the swing shaft of the handle extends and an open-close direction of the case cover.

4. The storage case according to claim 1,
   wherein in the locked state, the latch receiving portion and the handle receiving portion are positioned on a same straight line in a vertical direction perpendicular to the direction in which the swing shaft of the handle extends and an open-close direction of the case cover.

5. The storage case according to claim 1,
wherein the locking member extends in parallel to the swing shaft of the handle.

6. The storage case according to claim 1,
wherein the handle includes a pair of support arms swingably connected to an outer surface of the case, and a grip connecting the pair of support arms, and
wherein when the handle is downed, the locking member is positioned between the swing shaft of the pair of support arms and the grip.

7. The storage case according to claim 1,
wherein the locking mechanism includes a support member slidably supporting the locking member along a locking operation direction, and
wherein the support member has a convex portion formed on a support surface of the support member, the convex portion being configured to be in point contact or in line contact with the locking member.

8. The storage case according to claim 7,
wherein the locking member is cut out so as to hook the latch receiving portion and the handle receiving portion, and
wherein the convex portion of the support member is in contact with at least a part of the locking member during locking and unlocking operations.

9. The storage case according to claim 1,
wherein the locking mechanism includes a key cylinder which operates the locking member, and
the key cylinder is arranged in the direction in which the swing shaft of the handle extends with respect to the first locking piece and the second locking piece.

10. The storage case according to claim 1,
wherein during a locking operation and an unlocking operation, the locking member is configured to move in the direction in which the swing shaft of the handle extend.

* * * * *